United States Patent [19]

Ross et al.

[11] 4,117,531
[45] Sep. 26, 1978

[54] ELECTROLYTIC CAPACITOR

[75] Inventors: Sidney D. Ross; Franz S. Dunkl, both of Williamstown; Manuel Finkelstein, North Adams, all of Mass.

[73] Assignee: Sprague Electric Company, North Adams, Mass.

[21] Appl. No.: 800,258

[22] Filed: May 25, 1977

[51] Int. Cl.$^2$ .............................................. H01G 9/02
[52] U.S. Cl. .................................... 361/433; 252/62.2
[58] Field of Search ........................ 252/62.2; 361/433

[56] References Cited

U.S. PATENT DOCUMENTS

| | | | |
|---|---|---|---|
| 3,346,782 | 10/1967 | Alwitt et al. | 252/62.2 X |
| 3,490,740 | 1/1970 | Sternbeck et al. | 252/62.2 |
| 3,518,499 | 6/1970 | Shepherd et al. | 252/62.2 X |
| 3,547,423 | 12/1970 | Jenny et al. | 252/62.2 X |
| 3,696,037 | 10/1972 | Lagercrantz et al. | 252/62.2 |
| 3,812,039 | 5/1974 | Niwa | 252/62.2 |
| 3,835,055 | 9/1974 | Chesnut | 252/62.2 |

OTHER PUBLICATIONS

Frankel et al. "J. Am. Chem. Soc." vol. 75, pp. 330–332, 1953.
Edwards "Chem. Abstract", vol. 78, 1973.

*Primary Examiner*—Jack Cooper
*Attorney, Agent, or Firm*—Connolly and Hutz

[57] ABSTRACT

An electrolyte system for electrolytic capacitors contains as solute an ammonium or amine salt of an amic acid or an amate. These salts may be obtained by the reaction of maleic, succinic, phthalic, or hexahydrophthalic anhydride with ammonia or an amine.

10 Claims, 1 Drawing Figure

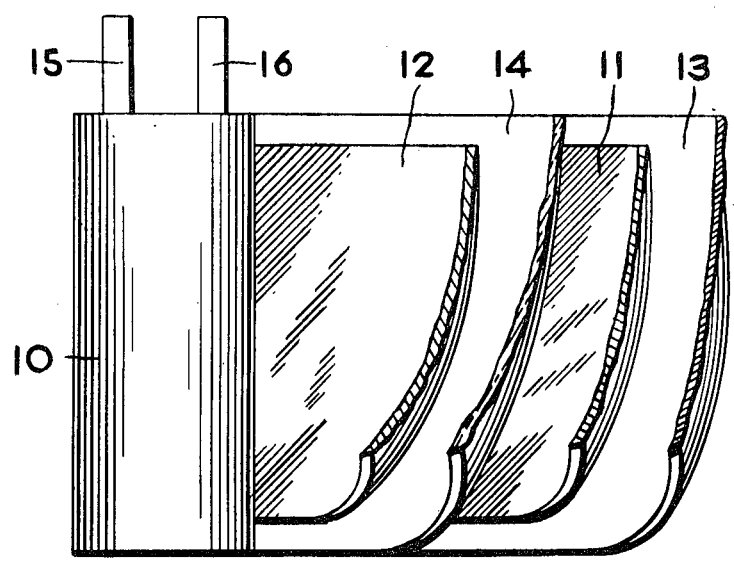

ELECTROLYTIC CAPACITOR

BACKGROUND OF THE INVENTION

The present invention relates to electrolyte systems for electrolytic capacitors and specifically to novel solutes for such electrolytes.

Conventional electrolytes for electrolytic capacitors generally contain a solvent and a conducting species or ionogen. For use below 100° C., the solvent frequently is ethylene glycol and contains a boric acid or borate solute.

A major drawback of this system is that glycol and borate species, e.g. boric acid or ammonium pentaborate, interact to form glycol polyborates and water. This esterification reaction results in an increase in the viscosity and resistivity of the system. The water formed, if contained, results in the build-up of internal pressures at elevated temperatures and can be the cause of capacity loss due to hydration of the anode or cathode foil. If, as is more common, the water vapor formed escapes through the capacitor case, the esterification equilibrium is continually being shifted in the direction for formation of more polymer and more water. The reaction becomes a continuous source of water, and operation of the capacitor near or above 100° becomes impractical.

A simpler solute, not subject to esterification and/or polymer formation is desirable. Ammonia and amine salts of carboxylic acid such as formic acid, adipic acid, and succinic acid have been used, but these tend to form amides when heated at or above 100°, as indicated for the ammonium salt shown below:

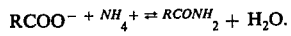

$$RCOO^- + NH_4^+ \rightleftharpoons RCONH_2 + H_2O.$$

This reaction is accompanied by an undesirable increase in the resistivity of the electrolyte.

It has been discovered that an ammonium or amine salt of an amic acid or an amate as solute provides an electrolyte with the desired resistivity and stability at operating temperatures. Specifically useful are the amate or salt derived from maleic, succinic, phthalic, or hexahydrophthalic acid which may be obtained by reacting the corresponding anhydride with ammonia or amine of the formula $R_1R_2NH$ in which $R_1$ and $R_2$ are selected from hydrogen or alkyl, cycloalkyl, or aryl group or together with N form a heterocyclic group. When one mol of the anhydride is reacted with one mol of ammonia or a primary or secondary amine, the corresponding amic acid is produced. When 2 mols of ammonia or primary or secondary amine are used per mol of anhydride, the corresponding amate is formed. Alternately, the amate may be produced by reacting an amic acid with ammonia or the same or different amine. Schematically

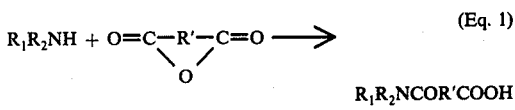

(Eq. 1)

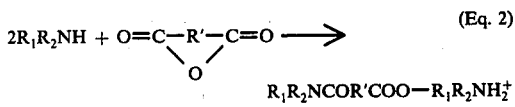

(Eq. 2)

(Eq. 3)

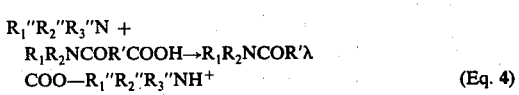

(Eq. 4)

The amate was shown above as dissociated. Actually

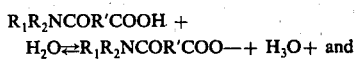

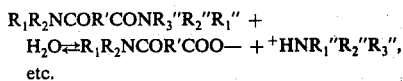

etc.

In the equations, $R_1$, $R_2$, $R_1''$, $R_2''$, and $R_3''$ are selected from hydrogen or alkyl, cycloalkyl, or aryl group or together with N form a heterocyclic ring. Suitable compounds are ammonia, piperidine, aniline, benzylamine, morpholine, methylamine, dimethylamine, n-propylamine, diisopropylamine, t-butylamine, or triethylamine. $R'$ is the hydrocarbon group of the anhydride which is maleic, succinic, phthalic, or hexahydrophthalic anhydride.

A typical preparation of the amic acids and amates or salts of this invention involves treating the anhydride in ether with ammonia or with an appropriate amine in ether. In the table below, the anhydride, amine used, product, yield, melting point range, and % N or neutralization equivalent, calcd. and found, are given.

Table I

| Anhydride | Amine | Product | Yeild | M.P.° C | % N calcd. | % N Found |
|---|---|---|---|---|---|---|
| maleic | t-butylamine | (t-butylammonium-N-t-butylmaleamate | 72.7% | 183–5 | 11.46 | 11.27 |
| maleic | aniline | N-phenyl maleamic acid | 96.3% | 193–4 | 7.33 | 6.92 |
| maleic | morpholine | N-morpholinomaleamic acid | 78.9% | 120–4 | 7.56 | 7.53 |
| maleic | n-propylamine | (n-propylammonium-N-(n-propylmaleamate | 23.0% | 219–220 | 12.95 | 12.77 |
| succinic | ammonia | ammonium succinamate | 82% | 115–120 | 20.88 | 20.14 |
| succinic | t-butylamine | (t-butylammonium-N-(t-butylsuccinamate | 82% | 156–62 | 11.37 | 10.94 |
| succinic | ammonia | succinamic acid | 78% | 157–8 | — | — |
| succinic | dimethylamine | N,N-dimethylsuccinamic acid | 52% | 85–7 | NE=143 | NE=146 |
| succinic | aniline | N-phenylsuccinamic acid | 92% | 149–51 | — | — |
| hexahydro-phthalic | ammonia | ammonium hexahydrophthalamate | 77% | 141–6 | 14.88 | 14.47 |
| hexahydro-phthalic | t-butylamine | (t-butylammonium-N-t-butyl(hexahydrophthalamate | 81% | 165–9 | 9.23 | 9.23 |
| hexahydro-phthalic | diisopropylamine | (diisopropylammonium-N-diisopropyl-(hexahydrophthalamate | 56% | 116–24 | 7.86 | 7.73 |
| succinic | N-methylbenzylamine | (N-methyl-N-benzyl-(succinamic acid | 79.0% | 65–6 | NE=221 | NE=220 |
| phthalic | ammonia | ammonium phthalamate | 78.0% | 235–7 | 15.29 | 15.19 |
| phthalic | dimethylamine | (dimethylammonium-N,N- | 81.7% | 126–8 | NE=193 | NE=199 |

Table I-continued

| Anhydride | Amine | Product | Yeild | M.P.° C | % N calcd. | % N Found |
|---|---|---|---|---|---|---|
| phthalic | n-propylamine | (dimethylphthalamate N-propylphthalamic acid | 90.8% | 111-13 | NE=207 | NE=212 |

The amic acid salt or amate may be preformed and added to the desired solvent or produced in-situ. In addition, at least one inorganic acid may be present, specifically phosphoric or boric acid to improve leakage current, forming properties, and conductivity as taught by the prior art. Small amounts of water may be added to improve specific resistance at room temperature without adversely affecting performance at operating temperatures.

BRIEF DESCRIPTION OF THE DRAWING

The drawing shows a capacitance section 10 in partly unrolled condition. Anode 11 is of a valve metal having on its surface an insulating oxide layer. Cathode 12 may also be a valve metal or of another metal, such as silver. Electrolyte absorbent films 13 and 14, e.g. of Kraft paper, are positioned between the anode and the cathode. Tabs 15 and 16, e.g. of aluminum, are connected to electrodes 11 and 12 respectively to function as terminals for the capacitance section. The electrolyte of the present invention is not shown in the drawing but in use completely impregnates the capacitance section.

In the following examples N-methylformamide is abbreviated as NMF and dimethylformamide as DMF. Table II shows formulations based on maleamic acid compounds and present specific resistivity at 25° C. in ohm-cm (Ωcm), maximum formation voltage at 25° C. for Al foil, and maximum formation voltage at 85° C. for Al foil.

Table II

| Formulation | | Ω-cm | $V_{max}^{25°}$ | $V_{max}^{85°}$ |
|---|---|---|---|---|
| I | 9.55 g N-phenylmaleamic acid 5.06 g diisopropylamine 90.0 g NMF | 171 | 118 | 116 |
| II | I + 3% H$_2$O | 167 | 135 | 116 |
| III | 8.55 g t-butylammonium-N-t-butylmaleamate 3.27 ml conc. NH$_3$ 90.0 g NMF | 164 | 184 | 170 |
| IV | 7.85 g N-n-propylmaleamic acid 3.27 ml conc. NH$_3$ 90.0 g NMF | 139 | 203 | 188 |
| V | 7.85 g N-n-propylmaleamic acid 5.80 g triethylamine 100.0 g DMF 3.0 g H$_2$O | 516 | 149 | 220 |
| VI | V + 0.1 g conc. H$_3$PO$_4$ | 506 | 312 | 278 |
| VII | 15.7 g N-n-propylmaleamic acid 5.06 g triethylamine 100 g DMF 3.09 g H$_3$BO$_3$ | 290 | 103 | 184 |
| VIII | VII + 3 g H$_2$O | 247 | 158 | 320 |
| IX | VIII + 3.09 g H$_3$BO$_3$ 5.06 g triethylamine | 212 | 150 | 357 |
| X | 9.26 g N-morpholinomaleamic acid 100 g DMF 5.05 g diisopropylamine 3% H$_2$O | 730 | 287 | 223 |

Table III presents data on succinamic acid compounds and hexahydrophthalamic compounds. Specific resistivity in ohm-cm (Ω-cm), maximum formation voltage at 25° C., 85° C., and 105° C. (except as noted) are presented as are comparative data on stability after heating for specified times and at specified temperatures.

Table III

| Formulation | | Ω-cm | $V_{max}^{25°}$ | $V_{max}^{85°}$ | $V_{max}^{105°}$ |
|---|---|---|---|---|---|
| I | 20 g ammonium succinamate 100 cc 3:1 glycol-methyl Cellosolve (by vol) 4 wt % H$_2$O | 287 | 190 | 205 | |
| II | I heated 64 hr. at 85° C | 286 | 234 | 255 | |
|  | heated further to 267 hr 85° C | 293 | — | — | |
| III | 160.6 g glycol 6 ml H$_2$O 10 g ammonium succinamate | 519 | 230 | 230 | 317 (115°) |
| IV | III heated 81 hrs., 85° C further heating, 201 hrs., 85° C further heating, 626 hrs., 85° C | 568 598 582 | 237 — — | — — — | 367 — — |
| V | 5.86 g succinamic acid 0.85 g NH$_3$ 2.09 g H$_2$O 91.2 g glycol | 532 | 185 | — | 105 |
| VI | V heated 18 hrs., 85° C | 520 | 224 | — | 108 |
| VII | VI + 2 ml H$_2$O and further heating to 112 hrs., 85° C further heating, 90 hrs., to 105° C | 514 558 | 255 — | — — | 313 — |
| VIII | 10 g ammonium succinamate 6 ml H$_2$O 144 ml glycol | 527 | 201 | — | 195 |
| IX | VIII heated 216 hr., 85° C | 601 | 275 | — | 325 |
| X | 15 g t-butylammonium-N-t-butylsuccinamate 96 ml glycol 4 ml H$_2$O | 922 | 387 | 241 | — |

The Tables II and III show that these solutes show reasonable resistivity stability vs. time at operating temperatures, e.g. 85° C. or 105° C. The data also show that formation capabilities do not deteriorate with heating.

When low temperatrue performance is not critical, glycol is the preferred solvent for operation up to 200V. For low voltage electrolytes (up to 100V), particularly for low temperature operation, a glycol-methylcellosolve system is preferred.

The electrolyte system of the present invention as described in the samples is merely illustrative and not exhaustive is scope. Modifications and variations, as well as substitution of equivalents, may be made without departing from the spirit of the invention as defined in the appended claims.

What is claimed is:

1. An electrolytic capacitor comprising a capacitance section having a plurality of electrodes, at least one being a valve-metal electrode having a dielectric layer on its surface, said section being impregnated with an electrolyte comprising a solvent selected from the group consisting of dimethylformamide, N-methylformamide, glycol, and glycol-methylcellosolve, and a solute consisting essentially of a compound selected from the group consisting of ammonium or amine salts of an amic acid selected from the group consisting of maleamic, succinamic, phthalamic, and hexahydrophthalamic acids.

2. An electrolytic capacitor as claimed in claim 1 wherein said amine has the formula R$_1$R$_2$R$_3$N in which R$_1$, R$_2$, and R$_3$ are selected from the group consisting of hydrogen, alkyl, aryl, and cycloalkyl groups or together with N form a heterocyclic group.

3. An electrolytic capacitor as claimed in claim 1 where said electrolyte has a resistivity within the range of about 139 to about 922 Ω -cm at 25° C.

4. An electrolytic capacitor as claimed in claim 2 wherein $R_1R_2R_3N$ is selected from the group consisting of ammonia, piperidine, aniline, benzylamine, morpholine, methylamine, dimethylamine, trimethylamine, n-propylamine, diisopropylamine, and t-butylamine.

5. An electrolytic capacitor as claimed in claim 2 wherein said elecrolyte contains additionally at least one inorganic acid selected from about 0.075 wt % $H_3PO$ and from about 2.5 wt % to about 4.6 wt % $H_3BO_3$.

6. An electrolytic capacitor as claimed in claim 2 wherin said electrolyte additionally contains up to 4 wt % water.

7. An electrolytic capacitor according to claim 1 wherein the solvent is selected from the group consisting of glycol and a glycol-methylcellosolve mixture.

8. An electrolytic capacitor according to claim 7 wherein the solute is ammmonium succinamate and the solvent is glycol.

9. An electrolytic capacitor according to claim 7 wherein the solute is ammonium succinamate and the solvent is a glycolmethylcellosolve mixture.

10. An electroyltic capacitor according to claim 1 wherein said valve-metal electrode is an aluminum electrode.

* * * * *